United States Patent
Kodama et al.

(10) Patent No.: US 7,306,538 B2
(45) Date of Patent: Dec. 11, 2007

(54) HYDRAULIC CONTROL APPARATUS AND METHOD FOR AUTOMATIC TRANSMISSION

(75) Inventors: Yoshihisa Kodama, Yokohama (JP); Midori Yamaguchi, Yokohama (JP); Hisao Nobu, Tokyo (JP); Kouhei Wakida, Kanagawa (JP)

(73) Assignee: JATCO Ltd, Shizuoka (JP)

( * ) Notice: Subject to any disclaimer, the term of this patent is extended or adjusted under 35 U.S.C. 154(b) by 252 days.

(21) Appl. No.: 11/237,904

(22) Filed: Sep. 29, 2005

(65) Prior Publication Data

US 2006/0070475 A1 Apr. 6, 2006

(30) Foreign Application Priority Data

Sep. 30, 2004 (JP) .............................. 2004-289328

(51) Int. Cl.
*F16H 61/662* (2006.01)
*F16H 59/00* (2006.01)
(52) U.S. Cl. .......................................... 477/44; 477/98
(58) Field of Classification Search ................. 477/44, 477/45, 46, 48, 49, 98
See application file for complete search history.

(56) References Cited

U.S. PATENT DOCUMENTS 7,104,907 B2 * 9/2006 Jozaki et al. .................. 474/28
2004/0063523 A1 4/2004 Jozaki et al.

FOREIGN PATENT DOCUMENTS

JP 2004-124959 A 4/2004

* cited by examiner

*Primary Examiner*—Dirk Wright
(74) *Attorney, Agent, or Firm*—Foley & Lardner LLP

(57) ABSTRACT

A hydraulic control apparatus for an automatic transmission with a line pressure regulator valve operative to regulate an oil pressure produced by an oil pump and set a line pressure, the hydraulic control apparatus including a control unit outputting a first command for controlling the line pressure regulator valve to set the line pressure to a minimum value immediately after engine start, and a second command for controlling the line pressure regulator valve to set the line pressure to a target value in accordance with increase in engine speed. The control unit is programmed to set the target value of the line pressure to a value smaller than a maximum value of the line pressure and/or reduce a target speed of engine speed, upon start of the engine in a low temperature condition.

13 Claims, 3 Drawing Sheets

HYDRAULIC CONTROL APPARATUS AND METHOD FOR AUTOMATIC TRANSMISSION

BACKGROUND OF THE INVENTION

The present invention relates to a hydraulic control apparatus and method for an automatic transmission, and specifically, relates to a hydraulic control apparatus and method for suitably controlling a working oil pressure to be supplied to the automatic transmission under engine low temperature condition, for example, −20° C. or less.

There has been proposed a hydraulic control apparatus for a belt-drive continuously variable transmission, which includes an oil pump driven by an engine through sprockets and a chain therebetween to discharge a working oil. The working oil discharged from the oil pump is fed to a pressure regulator valve to set a line pressure that is supplied to the automatic transmission. A solenoid-operated valve is connected with the pressure regulator valve. A control unit outputs a command to the solenoid-operated valve so as to produce and transmit a signal pressure to the pressure regulator valve. In response to the signal pressure, the pressure regulator valve sets the line pressure. The line pressure is set to a minimum value immediately after engine start and to a target value raised as the engine speed increases after the engine start.

In the conventional art as described above, there occurs overshoot in the line pressure when the line pressure abruptly varies from the minimum value immediately after the engine start to the target value raised in accordance with increase in engine speed after the engine start. FIG. 3 illustrates the overshoot in line pressure $P_L$. In addition, the overshoot becomes significant when a vehicle driver operates an accelerator to rapidly increase the engine speed after the engine start, thereby causing abrupt increase in amount of the working oil discharged from the oil pump. Further, there occurs more significant overshoot in line pressure $P_L$ upon start of the engine in a low temperature condition thereof, for example, at the temperature of −20° C. or less. FIG. 4 illustrates the overshoot under the low temperature engine condition. The overshoot as shown in FIG. 4 will cause an excessive pressure to be applied to pulleys of the continuously variable transmission, and an overload to the chain for driving the oil pump. This requires an expensive chain capable of withstanding the overload.

Japanese Patent Application First Publication No. 2004-124959 (corresponding to U.S. Patent Application Publication No. 2004/0063523 A1) describes a method of controlling a line pressure in an automatic transmission in order to suppress overshoot in the line pressure. In this document, at engine start in a low temperature condition, when the actual line pressure equal to or greater than a preset value continues for a period longer than a preset time, it is determined that line pressure $P_L$ is in a regulated state, and a command pressure for controlling line pressure $P_L$ is maximized.

SUMMARY OF THE INVENTION

However, in the above-described related art, the time at which the command pressure is to be maximized is merely delayed. Therefore, it is difficult to solve the problem of overshoot caused by abruptly increasing the command pressure as explained above.

The present invention has been made to solve the problem of the related art. An object of the present invention is to provide a hydraulic control apparatus and method for an automatic transmission, capable of suppressing the overshoot that occurs when a line pressure to be supplied to the automatic transmission is raised at engine start in a low temperature condition.

In one aspect of the present invention, there is provided a hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to set the target value of the line pressure to a value smaller than a maximum value of the line pressure to thereby suppress an amount of oil discharged from the oil pump, upon start of the engine in a low temperature condition.

In a further aspect of the present invention, there is provided a hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to reduce a target speed of engine speed to thereby suppress an amount of oil discharged from the oil pump, upon start of the engine in a low temperature condition.

In a still further aspect of the present invention, there is provided a hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to set the target value of the line pressure to a value smaller than a maximum value of the line pressure and reduce a target speed of engine speed to thereby suppress an amount of oil discharged from the oil pump, upon start of the engine in a low temperature condition.

In a still further aspect of the present invention, there is provided a method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine; and setting the target value of the line pressure to a value smaller than a maximum value of the line-pressure upon start of the engine in a low temperature condition.

In a still further aspect of the present invention, there is provided a method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine; and reducing a target speed of engine speed upon start of the engine in a low temperature condition.

In a still further aspect of the present invention, there is provided a method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine;

setting the target value of the line pressure to a value smaller than a maximum value of the line pressure upon start of the engine in a low temperature condition; and reducing a target speed of engine speed upon the start of the engine in the low temperature condition.

DETAILED DESCRIPTION OF THE INVENTION

Figure 1:
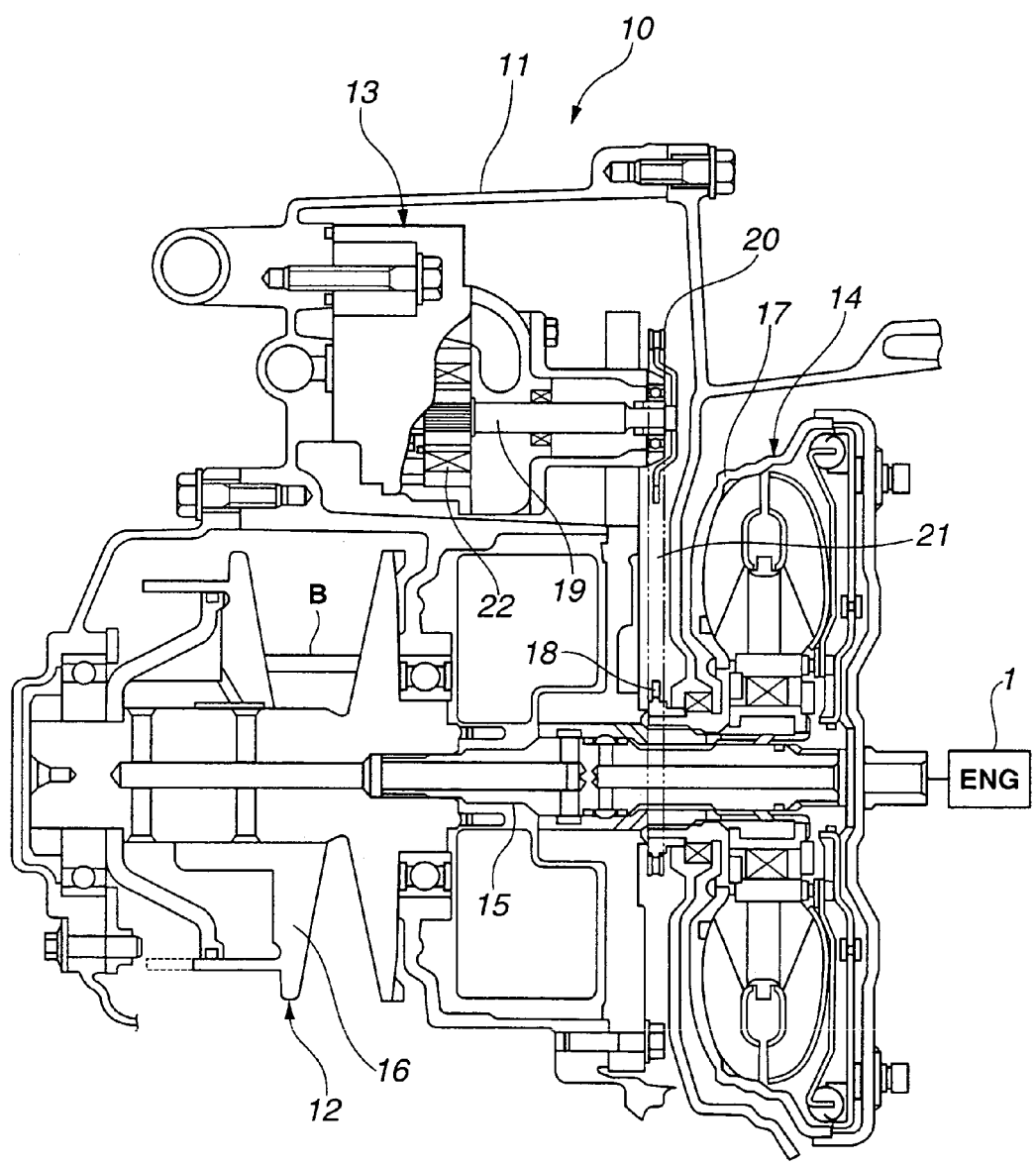
FIG. 1 is a section of a belt-drive continuously variable transmission, to which a hydraulic control apparatus according to the present invention is applicable.

In the followings, embodiments of the present invention will be described with reference to the accompanying drawings. FIG. 1 illustrates an automatic transmission to which a hydraulic control apparatus according to the embodiments of the present invention can be applied. As illustrated in FIG. 1, automatic transmission 10 is a belt-drive continuously variable transmission. Automatic transmission 10 includes transmission casing 11, and transmission mechanism 12 and oil pump 13 which are accommodated in transmission casing 11. Transmission mechanism 12 is coupled to engine 1 via torque converter 14 and main shaft 15 as an input shaft. Rotation of engine 1 is transmitted to primary pulley 16 of transmission mechanism 12 via torque converter 14. Transmission mechanism 12 includes primary pulley 16 and a secondary pulley, not shown, which are coupled to each other through belt B. Each of primary pulley 16 and the secondary pulley has an axially extending pulley width. The pulley width is variably controlled to thereby change a contact radius at the contact portion between belt B and respective pulleys. Transmission mechanism 12 thus performs a continuous shit operation.

Oil pump 13 discharges a working oil under pressure for hydraulically controlling the respective pulleys of transmission mechanism 12 to conduct the continuous shit operation.

Oil pump 13 includes rotation shaft 19 having an end to which sprocket 20 as a driven sprocket is coupled. Sprocket 20 is connected with sprocket 18 as a drive sprocket which is mounted to torque converter shell 17 of torque converter 14. Sprockets 18 and 20 are coupled to each other through chain 21. When the rotation of engine 1 is transmitted to rotation shaft 19 via torque converter 14 and chain 21 connecting sprockets 18 and 20, rotation shaft 19 is rotatively driven to actuate pump gear 22. Oil pump 13 thus is driven to produce a working oil pressure.

Figure 2:
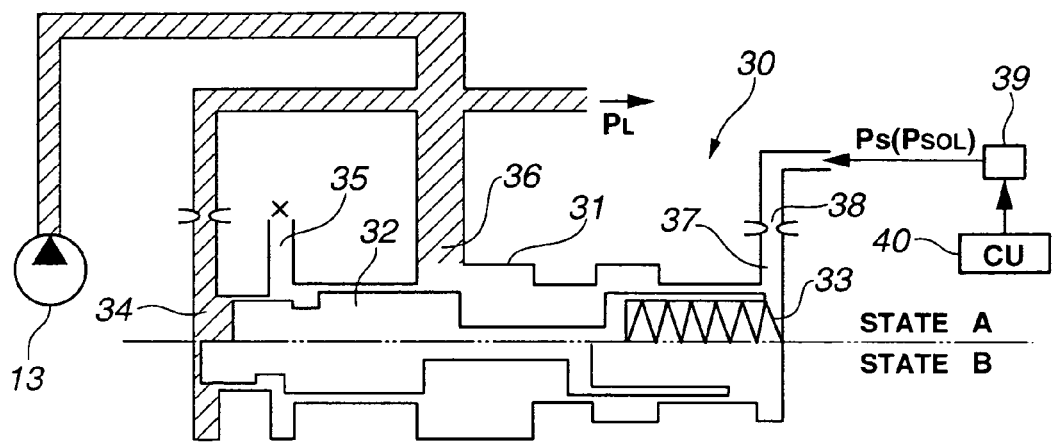
FIG. 2 is a schematic diagram showing a pressure regulator valve used in the continuously variable transmission of FIG. 1, and operational states of the pressure regulator valve.
Figure 3:
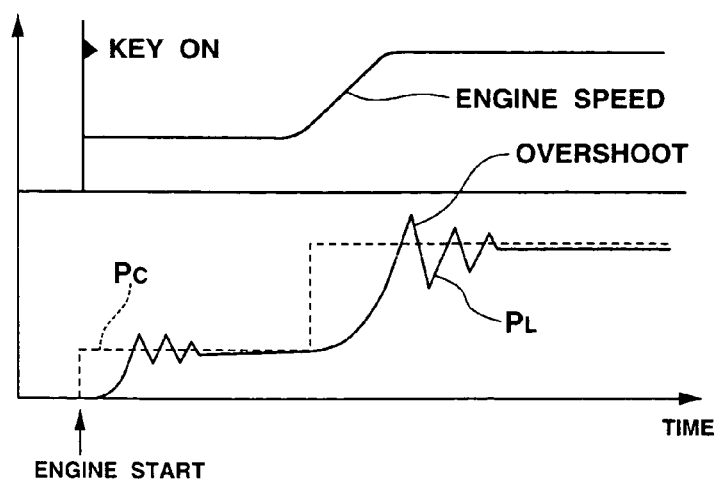
FIG. 3 is a time chart illustrating variation in engine speed and line pressure upon operation of line pressure control of the conventional art upon engine start in a low temperature condition.

The oil pressure produced by oil pump 13 is fed to line pressure regulator valve 30. FIG. 2 schematically shows a construction of line pressure regulator valve 30 and an operation thereof. Line pressure regulator valve 30 is operative to regulate the oil pressure produced by oil pump 13 and set line pressure $P_L$ to be supplied to transmission mechanism 12. As illustrated in FIG. 2, line pressure regulator valve 30 includes housing 31, and spool 32 and spring 33 which are disposed within housing 31. Line pressure regulator valve 30 has four ports 34, 35, 36 and 37. Port 35 is a drain port. Port 37 is connected with solenoid-operated valve 39 electronically connected to control unit 40.

Control unit 40 outputs to solenoid-operated valve 39, a command for controlling line pressure regulator valve 30 to set line pressure $P_L$ to minimum value $P_{Lmin}$ immediately after start of engine 1, and a command for controlling line pressure regulator valve 30 to maintaining minimum value $P_{Lmin}$ for a predetermined period of time and when the predetermined period of time is elapsed, set line pressure $P_L$ to a target value at which transmission mechanism 12 is operable, in accordance with increase in engine speed after the start of engine 1. Control unit 40 may include one or more microcomputers each including a central processing unit (CPU), a read-only memory (ROM), a random access memory (RAM), and input/output interface (I/O interface).

Specifically, control unit 40 is programmed to set first command pressure Pc for controlling line pressure regulator valve 30 to set line pressure $P_L$ to minimum value $P_{Lmin}$ immediately after start of engine 1, and output a command corresponding to the first command pressure Pc to solenoid-operated valve 39. Control unit 40 is further programmed to maintain the first command pressure Pc for the predetermined period of time and output a command for controlling line pressure regulator valve 30 to maintain the first command pressure Pc for the predetermined period of time, to solenoid-operated valve 39. Control unit 40 is further programmed to, when the predetermined period of time is elapsed, set second command pressure Pc for controlling line pressure regulator valve 30 to set line pressure $P_L$ to the target value in accordance with increase in engine speed after the engine start, and output a command corresponding to the second command pressure Pc to solenoid-operated valve 39.

In response to the command corresponding to the first command pressure Pc from control unit 40, solenoid-operated valve 39 produces oil pressure $P_{SOL}$, i.e., signal pressure Ps, for operating line pressure regulator valve 30 to set line pressure $P_L$ to minimum value $P_{Lmin}$. When signal pressure Ps is applied to port 37 of line pressure regulator valve 30, spool 32 is moved from the right side toward the left side as viewed in FIG. 2. Namely, spool 32 is displaced from state A toward state B as illustrated in FIG. 2. Generally, immediately after engine start, especially, in a low temperature condition, the working oil has an increased viscosity, so that the control of line pressure $P_L$ to minimum value $P_{Lmin}$ is required in order to reduce load of oil pump 13 upon driving. Next, in response to the command for controlling line pressure regulator valve 30 to maintain the first command pressure Pc for the predetermined period of time, solenoid-operated valve 39 produces signal pressure Ps for operating line pressure regulator valve 30 to maintain minimum value $P_{Lmin}$ for the predetermined period of time. In response to signal pressure Ps, spool 32 of line pressure regulator valve 30 is moved to state B and kept in state B such that minimum value $P_{Lmin}$ is maintained for the predetermined period of time.

In response to the command corresponding to the second command pressure Pc from control unit 40, solenoid-operated valve 39 produces signal pressure Ps for operating line pressure regulator valve 30 to set line pressure $P_L$ to the target value. As an engine speed increases, an amount of working oil discharged by oil pump 13 is increased to thereby cause raise in line pressure $P_L$. Owing to the raise in line pressure $P_L$, spool 32 is displaced from state B toward state A. In this condition, when signal pressure Ps applied to port 37, feedback pressure PF applied to port 34, which is equal to line pressure $P_L$, and the biasing force of spring 33 are balanced, line pressure $P_L$ is set to the target value.

Control unit 40 is further programmed to set the target value of line pressure $P_L$ to predetermined value $P_{Lmid}$ smaller than maximum value $P_{Lmax}$ of line pressure $P_L$ to thereby suppress an amount of working oil discharged from oil pump 13, upon start of engine 1 in a low temperature condition. The low temperature condition may be a temperature condition of −20° C. or less. Specifically, control unit 40 is programmed to set command pressure Pc1 for controlling line pressure regulator valve 30 to set the target value of line pressure $P_L$ to predetermined value $P_{Lmid}$, and output a command corresponding to command pressure Pc1 to solenoid-operated valve 39, upon the engine start in the low temperature condition. Namely, command pressure Pc1 is smaller than command pressure Pc2 for generating maximum value $P_{Lmax}$ of line pressure $P_L$ and larger than the first command pressure Pc as described above. In response to command pressure Pc1 from control unit 40, solenoid-operated valve 39 produces signal pressure Ps for operating line pressure regulator valve 30 to set the target value of line pressure $P_L$ to predetermined value $P_{Lmid}$. Here, predetermined value $P_{Lmid}$ of line pressure $P_L$ is not smaller than a lower limit at which belt B of transmission mechanism 12 is prevented from undergoing slippage. By setting the target value of line pressure $P_L$ to predetermined value $P_{Lmid}$, namely, by setting command pressure Pc1 smaller than command pressure Pc2, the amount of working oil discharged from oil pump 13 can be reduced so as to suppress occurrence of overshoot in line pressure $P_L$. This results in effectively preventing the pulleys of transmission mechanism 12 from being damaged by an excessive pressure that is caused due to the overshoot. Also, the chain for driving oil pump 13 can be effectively prevented from being damaged by an excessive load that is caused due to the overshoot. Further, since predetermined value $P_{Lmid}$ of line pressure $P_L$ is not smaller than the lower limit for preventing occurrence of the slippage of belt B of transmission mechanism 12, the shift operation of continuously variable transmission 10 can be surely performed with being free from the slippage of belt B, while maintaining predetermined value $P_{Lmid}$ of line pressure $P_L$. This serves for ensuring the vehicle drivability.

Figure 4:
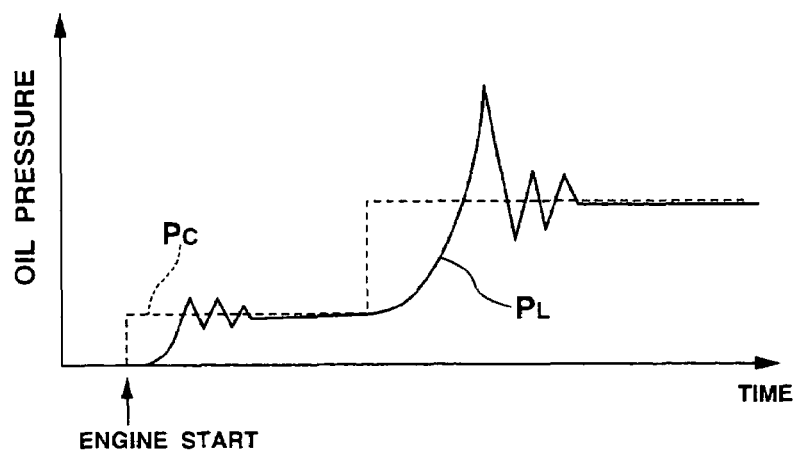
FIG. 4 is a time chart illustrating variation in line pressure upon operation of line pressure control of the conventional art, showing excessive overshoot in the line pressure.
Figure 5:
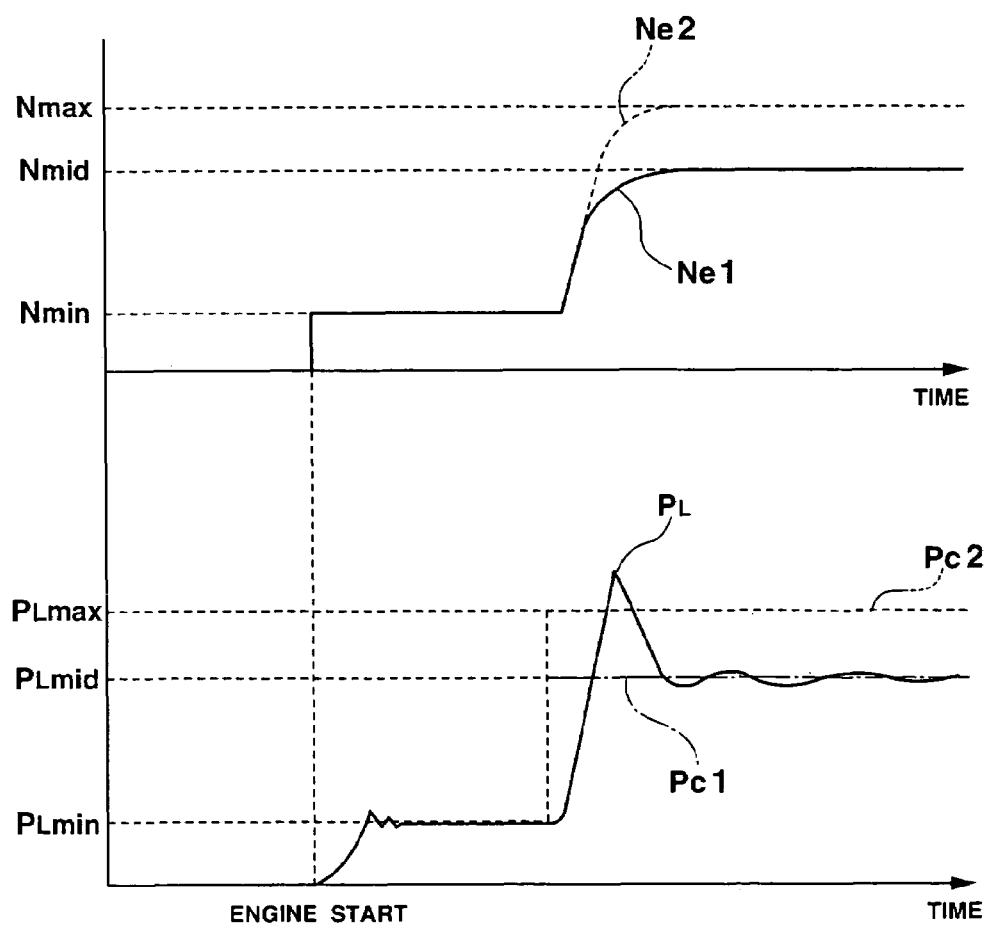
FIG. 5 is a time chart illustrating variation in line pressure and engine speed upon operation of line pressure control of the hydraulic control apparatus of embodiments of the present invention upon engine start in a low temperature condition.

Referring to FIG. 5, there is shown variation in line pressure $P_L$ and engine speed Ne upon engine start in a low temperature condition, which is exhibited upon operation of line pressure $P_L$ control in the first embodiment of the hydraulic control apparatus of the present invention. As illustrated in FIG. 5, immediately after the engine start in the low temperature condition, line pressure $P_L$ is set to minimum value $P_{Lmin}$. Minimum value $P_{Lmin}$ is then maintained for the predetermined period of time. As engine speed Ne increases after the predetermined period of time is elapsed, line pressure $P_L$ is raised to predetermined value $P_{Lmid}$ smaller than maximum value $P_{Lmax}$ which corresponds to command pressure Pc1. At this time, overshoot in line pressure $P_L$ as shown in FIG. 5 is considerably reduced as compared with overshoot in line pressure $P_L$ in the conventional art as shown in FIG. 4.

A second embodiment of the hydraulic control apparatus of the present invention will be explained hereinafter. The second embodiment differs in control of engine speed Ne upon engine start in a low temperature condition, from the control of line pressure $P_L$ upon the engine start in the low temperature condition in the first embodiment. Specifically, control unit 40 is programmed to, upon engine start in a low temperature condition, reduce a target speed of engine speed Ne to predetermined speed $N_{mid}$ lower than maximum speed $N_{max}$ of engine speed Ne, to thereby suppress an amount of working oil discharged from oil pump 13. Control unit 40 is further programmed to set engine speed Ne to predetermined low speed $N_{min}$ at start of engine 1, maintain predetermined low speed $N_{min}$ for a predetermined period of time, and raise predetermined low speed $N_{min}$ to the target speed when the predetermined period of time is elapsed. Predetermined low speed $N_{min}$ is lower than predetermined speed $N_{mid}$.

By reducing the target speed of engine speed Ne to predetermined speed $N_{mid}$ upon the engine start in the low temperature condition, the amount of working oil discharged from oil pump 13 can be prevented from being excessively increased due to abrupt raise from predetermined low speed $N_{min}$ to the target speed of engine speed Ne. As a result, overshoot in line pressure $P_L$ can be reduced. In the second embodiment, similar to the first embodiment, the control of line pressure $P_L$ is conducted such as to set line pressure $P_L$ to minimum value $P_{Lmin}$ immediately after the engine start, maintain minimum value $P_{Lmin}$ for the predetermined period of time and set line pressure $P_L$ to the target value in accordance with increase in engine speed Ne after the engine start, when the predetermined period of time is elapsed.

A third embodiment of the hydraulic control apparatus of the present invention now is explained, which is a combination of the first and second embodiments. In the third embodiment, upon the engine start in the low temperature condition, the control of line pressure $P_L$ as described in the first embodiment is conducted, and at the same time, the control of engine speed Ne as described in the second embodiment is conducted. In the third embodiment, the effects of reducing the amount of working oil discharged from oil pump 13 and suppressing the occurrence of overshoot in line pressure $P_L$ can be enhanced.

FIG. 5 shows on an upper side thereof, variation in engine speed Ne1 upon the engine start in the low temperature condition, which is exhibited upon operation of engine speed Ne control in the second and third embodiments, and variation in engine speed Ne2 upon the engine start in the low temperature condition in the conventional art. As indicated by solid line Ne1 in FIG. 5, at the engine start, engine speed Ne is set to predetermined low speed $N_{min}$. Predetermined low speed $N_{min}$ is maintained for the predetermined period of time. When the predetermined period of time is elapsed, predetermined low speed $N_{min}$ is raised to predetermined speed $N_{mid}$ lower than maximum speed $N_{max}$.

This application is based on prior Japanese Patent Application No. 2004-289328 filed on Sep. 30, 2004. The entire contents of the Japanese Patent Application No. 2004-289328 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to set the target value of the line pressure to a value smaller than a maximum value of the line pressure to thereby suppress an amount of oil discharged from the oil pump, upon start of the engine in a low temperature condition.

2. A hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to reduce a target speed of engine speed to thereby suppress an amount of oil discharged from the oil pump, upon start of the engine in a low temperature condition.

3. A hydraulic control apparatus for an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the hydraulic control apparatus comprising:

a control unit outputting a first command for controlling the line pressure regulator valve to set the line pressure to a minimum value immediately after start of the engine, and a second command for controlling the line pressure regulator valve to set the line pressure to a target value at which the transmission mechanism is operable in accordance with increase in engine speed after the start of the engine, the control unit being programmed to set the target value of the line pressure to a value smaller than a maximum value of the line pressure and reduce a target speed of engine speed to thereby suppress an amount of oil discharged from the oil pump, upon start of the engine in a low temperature condition.

4. The hydraulic control apparatus as claimed in claim 1, wherein the automatic transmission is a belt-drive continuously variable transmission including a belt, and the value smaller than the maximum value is not smaller than a lower limit at which the belt of the continuously variable transmission is prevented from undergoing slippage.

5. The hydraulic control apparatus as claimed in claim 2, wherein the automatic transmission is a belt-drive continuously variable transmission including a belt, and the value smaller than the maximum value is not smaller than a lower limit at which the belt of the continuously variable transmission is prevented from undergoing slippage.

6. The hydraulic control apparatus as claimed in claim 3, wherein the automatic transmission is a belt-drive continuously variable transmission including a belt, and the value smaller than the maximum value is not smaller than a lower limit at which the belt of the continuously variable transmission is prevented from undergoing slippage.

7. The hydraulic control apparatus as claimed in claim 2, wherein the target speed is reduced to a speed lower than a maximum speed of engine speed.

8. The hydraulic control apparatus as claimed in claim 2, wherein the control unit is further programmed to set engine speed to a speed lower than the reduced target speed at the start of the engine.

9. The hydraulic control apparatus as claimed in claim 3, wherein the target speed is reduced to a speed lower than a maximum speed of engine speed.

10. The hydraulic control apparatus as claimed in claim 3, wherein the control unit is further programmed to set engine speed to a speed lower than the reduced target speed at the start of the engine.

11. A method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine; and setting the target value of the line pressure to a value smaller than a maximum value of the line pressure upon start of the engine in a low temperature condition.

12. A method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine; and reducing a target speed of engine speed upon start of the engine in a low temperature condition.

13. A method of controlling an automatic transmission, the automatic transmission being coupled to an engine and including a transmission mechanism, a first sprocket rotatably driven by the engine, a second sprocket coupled to the first sprocket via a chain therebetween, an oil pump disposed spaced from the transmission mechanism and connected with the second sprocket, the oil pump being driven by the engine via the first and second sprockets and the chain so as to produce an oil pressure, and a line pressure regulator valve operative to regulate the oil pressure produced by the oil pump and set a line pressure to be supplied to the transmission mechanism, the method comprising:

setting the line pressure to a minimum value immediately after start of the engine;

setting the line pressure to a target value at which the transmission mechanism is operable in accordance with increase in engine speed after the start of the engine;

setting the target value of the line pressure to a value smaller than a maximum value of the line pressure upon start of the engine in a low temperature condition; and reducing a target speed of engine speed upon the start of the engine in the low temperature condition.

* * * * *